(12) United States Patent
Heegaard

(10) Patent No.: US 10,327,438 B2
(45) Date of Patent: Jun. 25, 2019

(54) MAGNETIC GAME CALL AND MODULAR SYSTEM

(71) Applicant: Nathan Heegaard, Minneapolis, MN (US)

(72) Inventor: Nathan Heegaard, Minneapolis, MN (US)

( * ) Notice: Subject to any disclaimer, the term of this patent is extended or adjusted under 35 U.S.C. 154(b) by 0 days.

(21) Appl. No.: 15/940,775

(22) Filed: Mar. 29, 2018

(65) Prior Publication Data

US 2018/0279602 A1 Oct. 4, 2018

Related U.S. Application Data

(60) Provisional application No. 62/478,082, filed on Mar. 29, 2017.

(51) Int. Cl.
*A01M 31/00* (2006.01)
*F16B 1/00* (2006.01)

(52) U.S. Cl.
CPC ............. *A01M 31/004* (2013.01); *F16B 1/00* (2013.01); *F16B 2001/0035* (2013.01)

(58) Field of Classification Search
CPC .. A01M 31/004; F16B 1/00; F16B 2001/0035
USPC ........ 446/188, 200, 202, 204, 207, 208, 216
See application file for complete search history.

(56) References Cited

U.S. PATENT DOCUMENTS

| | | |
|---|---|---|
| 2,324,926 A | 7/1943 | Havel |
| 3,141,353 A | 7/1964 | Gray |
| 4,143,485 A | 3/1979 | Stewart |
| 4,862,625 A | 9/1989 | Dolan |
| 4,950,198 A | 8/1990 | Repko |
| 5,529,526 A | 6/1996 | Wesley |
| 5,964,054 A | 10/1999 | Galfidi |
| 6,053,793 A | 4/2000 | Green |
| 6,149,492 A | 11/2000 | Davis |
| 6,179,684 B1 | 1/2001 | Carlton |
| 6,328,626 B1 | 12/2001 | Eubanks |
| 6,414,906 B1 | 7/2002 | Gaspari |
| 6,435,933 B1 | 8/2002 | Browne |
| 6,755,714 B1 | 6/2004 | Huddleston |
| 7,070,473 B1 | 7/2006 | Cassette |
| 7,637,795 B1 | 12/2009 | Dukart |
| 7,785,166 B1 | 8/2010 | Kirby |
| 7,878,879 B2 | 2/2011 | Simone |
| 8,016,637 B2 | 9/2011 | Pribbanow |
| 8,216,019 B2 | 7/2012 | Burcham |
| 8,398,452 B2 | 3/2013 | Coin |
| 8,517,792 B1 | 8/2013 | Foster |
| 8,727,828 B2 | 5/2014 | Pribbanow |
| 2002/0061703 A1 | 5/2002 | Greenwaldt |
| 2005/0142982 A1 | 6/2005 | Sceery |
| 2007/0026760 A1 | 2/2007 | Stong |
| 2007/0224908 A1 | 9/2007 | Vaught |
| 2008/0009222 A1 | 1/2008 | Lombardi |

(Continued)

*Primary Examiner* — Vishu K Mendiratta
(74) *Attorney, Agent, or Firm* — Mitchell A. Rossman; Terra Nova Patent Law, PLLC

(57) ABSTRACT

The present invention provides a magnetic game caller. The magnetic game caller includes a mouthpiece and a resonance insert. The resonance insert is coupled the mouthpiece by a magnetic contact between a ring in the magnetic ring in the mouthpiece and a magnetic ring in the resonance insert. The present invention also provides a magnetic game caller modular system. The magnetic game caller modular system includes: a mouthpiece and two or more resonance inserts.

14 Claims, 13 Drawing Sheets

(56) References Cited

U.S. PATENT DOCUMENTS

| | | |
|---|---|---|
| 2008/0020674 A1 | 1/2008 | Olinde |
| 2008/0274666 A1 | 11/2008 | Weider |
| 2009/0017717 A1 | 1/2009 | Marini |
| 2009/0191786 A1 | 7/2009 | Pribbanow |
| 2009/0258566 A1 | 10/2009 | May |
| 2011/0070806 A1 | 3/2011 | Burcham |
| 2011/0281493 A1 | 11/2011 | Barley et al. |
| 2012/0295511 A1 | 11/2012 | Coin |
| 2013/0052908 A1 | 2/2013 | Pribbanow |
| 2014/0051322 A1 | 2/2014 | Jackson |
| 2014/0213141 A1 | 7/2014 | Hassinger |
| 2014/0251840 A1 | 9/2014 | Norman |
| 2015/0031267 A1 | 1/2015 | Barrette |

MAGNETIC GAME CALL AND MODULAR SYSTEM

RELATED APPLICATIONS

This application claims priority to U.S. Provisional Patent Application Ser. No. 62/478,082 filed Mar. 29, 2017, which is hereby incorporated by reference in its entirety for all purposes.

BACKGROUND OF THE INVENTION

Game calls are primarily used for the pursuit of wild game. There are many kinds of game calls used to attract wild animals. Game calls can be categorized into two main categories: big game and small game calls. Big game calls are typically used to call elk, caribou, moose, cougar, bear, boar, wolf, sheep, and bison. Small game calls are typically used to call waterfowl (duck, goose, and other migratory birds), squirrel, rabbit, turkey, pheasant, and coyote.

In most game calls, the insert typically connects with the barrel using friction. The insert is inserted into the barrel with force and the friction between the barrel and the insert holds it into place. Other types of connections use threads, notches, or indentations on the insert or barrel to connect the two parts. One common complication that arises with these traditional ways of connecting the two parts is that the insert often falls out of the barrel or doesn't properly stay into place. The effectiveness of these traditional connections is also often hindered by the presence of condensation (such as rain, snow, and ice) and debris (such as dirt, mud, and sand). Weather can also play a role in the effectiveness of these connections by making it difficult to separate the insert from the barrel (or vice versa) due to expansion or contraction of the parts caused by extreme cold or hot temperatures.

What is needed is a game caller that avoids the problems described above.

SUMMARY OF THE INVENTION

The present invention provides a magnetic game caller. The magnetic game caller includes a mouthpiece and a resonance insert. The resonance insert is coupled the mouthpiece by a magnetic contact between a ring in the magnetic ring in the mouthpiece and a magnetic ring in the resonance insert. This magnetic connection avoids the problems of friction fitted game callers described above.

The present invention also provides a magnetic game caller modular system. The magnetic game caller modular system includes: a mouthpiece and two or more resonance inserts. The magnetic game caller modular system simplifies the user experience and results in lower manufacturing costs by creating a flexible universal magnetic connection for mouthpieces and resonance inserts. Thus, one mouthpiece can host a number of different types of resonance inserts. This rids the user of having to purchase multiple game callers.

The present invention provides a magnetic game caller. The magnetic game caller includes a mouthpiece having a proximal end, a distal end, one or more exterior surfaces, a first interior surface, a second interior surface, and a third interior surface, wherein the first interior surface of the mouthpiece is adjacent to the proximal end of the mouthpiece, wherein the second interior surface of the mouthpiece is between the first interior surface of the mouthpiece and the third interior surface of the mouthpiece, wherein the second interior surface of the mouthpiece includes a first ring including one or more first magnets, one or more first metal members, or a combination thereof, wherein the third interior surface of the mouthpiece is adjacent to the distal end of the mouthpiece; a resonance insert having a proximal end, a distal end, a first exterior surface, a second exterior surface, and a third exterior surface, and one or more interior surfaces, wherein the first exterior surface of the resonance insert is adjacent to the proximal end of the resonance insert; wherein the second exterior surface of the resonance insert is between the first exterior surface of the resonance insert and the third interior surface of the resonance insert, wherein the second exterior surface of the resonance insert has a diameter that is greater than a diameter of the first interior surface of the mouthpiece, wherein the second exterior surface of the resonance insert includes a second ring including one or more second magnets, one or more second metal members, or a combination thereof, wherein the third exterior surface of the resonance insert has a diameter that is equal to or greater than the diameter of the one or more exterior surfaces of the mouthpiece, wherein the resonance insert is coupled to and in fluid communication with the mouthpiece by a magnetic contact between the first ring and the second ring, and provided that if the one or more first magnets are present on the third interior surface of the mouthpiece, then one or more second magnets, one or more second metal members, or a combination thereof are present on the second exterior surface of the resonance insert, or provided that if the one or more first metal members are present on the third interior surface of the mouthpiece, then one or more second magnets are present on the second exterior surface of the resonance insert, or provided that if a combination of one or more first magnets and one or more first metal members are present on the third interior surface of the mouthpiece, then one or more second magnets, one or more second metal members, or a combination thereof are present on the second exterior surface of the resonance insert.

In one embodiment, the magnetic game caller is used to call waterfowl, upland game, small game, big game, or a combination thereof. In one embodiment, the magnetic game caller produces a game call in response to a passage of air into the mouthpiece and through the resonance insert that is generated by a user. In one embodiment, the mouthpiece includes one or more metals, one or more plastic, one or more woods, or a combination thereof. In one embodiment, the resonance insert includes one or more metals, one or more plastic, one or more woods, or a combination thereof. In one embodiment, the resonance insert further includes an insert body, a tone or sound board, a cork or wedge, and one or more reeds or one or more discs in the one or more interior surfaces of the resonance insert.

In one embodiment, the first ring includes one or more first magnets. In one embodiment, the first ring includes one or more first metal members. In one embodiment, the first ring includes a combination of more first magnets and more first metals. In one embodiment, the second ring includes one or more second magnets. In one embodiment, the second ring includes one or more second metal members. In one embodiment, the second ring includes a combination of more second magnets and more second metals.

In one embodiment, the first exterior surface of the resonance insert has a diameter that is equal to or less than a diameter of the third interior surface of the mouthpiece. In one embodiment, the second interior surface of the mouthpiece includes a seal ring between the first ring and the third interior surface. In one embodiment, the seal ring is an O-ring. In one embodiment, the one or more exterior surfaces of the mouthpiece include one or more exterior projections at the distal end of the mouthpiece. In one embodiment, the one or more exterior projections are operatively connected to a lanyard.

The present invention provides a magnetic game caller. The magnetic game caller includes a mouthpiece having a proximal end, a distal end, one or more exterior surfaces, a first interior surface, a second interior surface, and a third interior surface, wherein the first interior surface of the mouthpiece is adjacent to the proximal end of the mouthpiece, wherein the second interior surface of the mouthpiece is between the first interior surface of the mouthpiece and the third interior surface of the mouthpiece, wherein the second interior surface of the mouthpiece includes a first ring including one or more first magnets and an O-ring between the first ring and the third interior surface, wherein the third interior surface of the mouthpiece is adjacent to the distal end of the mouthpiece; a resonance insert having a proximal end, a distal end, a first exterior surface, a second exterior surface, and a third exterior surface, and one or more interior surfaces, wherein the first exterior surface of the resonance insert is adjacent to the proximal end of the resonance insert; wherein the second exterior surface of the resonance insert is between the first exterior surface of the resonance insert and the third interior surface of the resonance insert, wherein the second exterior surface of the resonance insert has a diameter that is greater than a diameter of the first interior surface of the mouthpiece, wherein the second exterior surface of the resonance insert includes a second ring including one or more second magnets, wherein the third exterior surface of the resonance insert has a diameter that is equal to or greater than the diameter of the one or more exterior surfaces of the mouthpiece, and wherein the resonance insert is coupled to and in fluid communication with the mouthpiece by a magnetic contact between the first ring and the second ring.

In one embodiment, the magnetic game caller is used to call waterfowl, upland game, small game, big game, or a combination thereof. In one embodiment, the magnetic game caller produces a game call in response to a passage of air into the mouthpiece and through the resonance insert that is generated by a user. In one embodiment, the mouthpiece includes one or more metals, one or more plastic, one or more woods, or a combination thereof. In one embodiment, the resonance insert includes one or more metals, one or more plastic, one or more woods, or a combination thereof. In one embodiment, the resonance insert further includes an insert body, a tone or sound board, a cork or wedge, and one or more reeds or one or more discs. In one embodiment, the one or more exterior surfaces of the mouthpiece include one or more exterior projections at the distal end of the mouthpiece. In one embodiment, the one or more exterior projections are operatively connected to a lanyard.

The present invention provides a magnetic game caller. The magnetic game caller includes a mouthpiece having a proximal end, a distal end, one or more exterior surfaces, a first interior surface, a second interior surface, and a third interior surface, wherein the first interior surface of the mouthpiece is adjacent to the proximal end of the mouthpiece, wherein the second interior surface of the mouthpiece is between the first interior surface of the mouthpiece and the third interior surface of the mouthpiece, wherein the second interior surface of the mouthpiece includes a first ring including one or more first magnets and an O-ring between the first ring and the third interior surface, wherein the third interior surface of the mouthpiece is adjacent to the distal end of the mouthpiece, wherein the one or more exterior surfaces of the mouthpiece include one or more exterior projections at the distal end of the mouthpiece, wherein the one or more exterior projections are operatively connected to a lanyard; a resonance insert having a proximal end, a distal end, a first exterior surface, a second exterior surface, and a third exterior surface, and one or more interior surfaces, wherein the first exterior surface of the resonance insert is adjacent to the proximal end of the resonance insert; wherein the second exterior surface of the resonance insert is between the first exterior surface of the resonance insert and the third interior surface of the resonance insert, wherein the second exterior surface of the resonance insert has a diameter that is greater than a diameter of the first interior surface of the mouthpiece, wherein the second exterior surface of the resonance insert includes a second ring including one or more second magnets, wherein the third exterior surface of the resonance insert has a diameter that is equal to or greater than the diameter of the one or more exterior surfaces of the mouthpiece, and wherein the resonance insert is coupled to and in fluid communication with the mouthpiece by a magnetic contact between the first ring and the second ring.

In one embodiment, the magnetic game caller is used to call waterfowl, upland game, small game, big game, or a combination thereof. In one embodiment, the magnetic game caller produces a game call in response to a passage of air into the mouthpiece and through the resonance insert that is generated by a user. In one embodiment, the mouthpiece includes one or more metals, one or more plastic, one or more woods, or a combination thereof. In one embodiment, the resonance insert includes one or more metals, one or more plastic, one or more woods, or a combination thereof. In one embodiment, the resonance insert further includes an insert body, a tone or sound board, a cork or wedge, and one or more reeds or one or more discs.

The present invention provides a magnetic game caller. The magnetic game caller includes: a mouthpiece having a proximal end, a distal end, one or more exterior surfaces, a first interior surface, a second interior surface, and a third interior surface, wherein the first interior surface of the mouthpiece is adjacent to the proximal end of the mouthpiece, wherein the second interior surface of the mouthpiece is between the first interior surface of the mouthpiece and the third interior surface of the mouthpiece, wherein the second interior surface of the mouthpiece includes a first ring including one or more first magnets and an O-ring between the first ring and the third interior surface, wherein the third interior surface of the mouthpiece is adjacent to the distal end of the mouthpiece; a resonance insert having a proximal end, a distal end, a first exterior surface, a second exterior surface, and a third exterior surface, and one or more interior surfaces, wherein the first exterior surface of the resonance insert is adjacent to the proximal end of the resonance insert; wherein the second exterior surface of the resonance insert is between the first exterior surface of the resonance insert and the third interior surface of the resonance insert, wherein the second exterior surface of the resonance insert has a diameter that is greater than a diameter of the first interior surface of the mouthpiece, wherein the second exterior surface of the resonance insert includes a second ring including one or more second magnets, wherein the third exterior surface of the resonance insert has a diameter that is equal to or greater than the diameter of the one or more exterior surfaces of the mouthpiece, and wherein the resonance insert is coupled to and in fluid communication with the mouthpiece by a magnetic contact between the first ring and the second ring, and wherein the resonance insert includes an insert body, a tone or sound board, a cork or wedge, and one or more reeds or one or more discs on the one or more interior surfaces of the resonance insert.

In one embodiment, the magnetic game caller is used to call waterfowl, upland game, small game, big game, or a combination thereof. In one embodiment, the magnetic game caller produces a game call in response to a passage of air into the mouthpiece and through the resonance insert that is generated by a user. In one embodiment, the mouthpiece includes one or more metals, one or more plastic, one or more woods, or a combination thereof. In one embodiment, the resonance insert includes one or more metals, one or more plastic, one or more woods, or a combination thereof. In one embodiment, the one or more exterior surfaces of the mouthpiece include one or more exterior projections at the distal end of the mouthpiece. In one embodiment, the one or more exterior projections are operatively connected to a lanyard.

The present invention provides a magnetic game caller. The magnetic game caller includes: a mouthpiece having a proximal end, a distal end, one or more exterior surfaces, a first interior surface, a second interior surface, and a third interior surface, wherein the first interior surface of the mouthpiece is adjacent to the proximal end of the mouthpiece, wherein the second interior surface of the mouthpiece is between the first interior surface of the mouthpiece and the third interior surface of the mouthpiece, wherein the second interior surface of the mouthpiece includes a first ring including one or more first magnets and an O-ring between the first ring and the third interior surface, wherein the third interior surface of the mouthpiece is adjacent to the distal end of the mouthpiece, wherein the one or more exterior surfaces of the mouthpiece include one or more exterior projections at the distal end of the mouthpiece, wherein the one or more exterior projections are operatively connected to a lanyard; a resonance insert having a proximal end, a distal end, a first exterior surface, a second exterior surface, and a third exterior surface, and one or more interior surfaces, wherein the first exterior surface of the resonance insert is adjacent to the proximal end of the resonance insert; wherein the second exterior surface of the resonance insert is between the first exterior surface of the resonance insert and the third interior surface of the resonance insert, wherein the second exterior surface of the resonance insert has a diameter that is greater than a diameter of the first interior surface of the mouthpiece, wherein the second exterior surface of the resonance insert includes a second ring including one or more second magnets, wherein the third exterior surface of the resonance insert has a diameter that is equal to or greater than the diameter of the one or more exterior surfaces of the mouthpiece, and wherein the resonance insert is coupled to and in fluid communication with the mouthpiece by a magnetic contact between the first ring and the second ring, and wherein the resonance insert includes an insert body, a tone or sound board, a cork or wedge, and one or more reeds or one or more discs on the one or more interior surfaces of the resonance insert.

In one embodiment, the magnetic game caller is used to call waterfowl, upland game, small game, big game, or a combination thereof. In one embodiment, the magnetic game caller produces a game call in response to a passage of air into the mouthpiece and through the resonance insert that is generated by a user. In one embodiment, the mouthpiece includes one or more metals, one or more plastic, one or more woods, or a combination thereof. In one embodiment, the resonance insert includes one or more metals, one or more plastic, one or more woods, or a combination thereof.

The present invention provides a magnetic game caller. The magnetic game caller includes: a mouthpiece having a proximal end, a distal end, one or more exterior surfaces, a first interior surface, and a second interior surface, wherein the first interior surface of the mouthpiece is adjacent to the proximal end of the mouthpiece, wherein the second interior surface of the mouthpiece includes a first ring including one or more first magnets, one or more first metal members, or a combination thereof, a resonance insert having a proximal end, a distal end, a first exterior surface, a second exterior surface, and one or more interior surfaces, wherein the second exterior surface of the resonance insert has a diameter that is less than a diameter of the second interior surface of the mouthpiece, wherein the second exterior surface of the resonance insert includes a second ring including one or more second magnets, one or more second metal members, or a combination thereof, wherein the resonance insert is coupled to and in fluid communication with the mouthpiece by a magnetic contact between the first ring and the second ring, and provided that if the one or more first magnets are present on the second interior surface of the mouthpiece, then one or more second magnets, one or more second metal members, or a combination thereof are present on the first exterior surface of the resonance insert, or provided that if the one or more first metal members are present on the second interior surface of the mouthpiece, then one or more second magnets are present on the first exterior surface of the resonance insert, or provided that if a combination of one or more first magnets and one or more first metal members are present on the second interior surface of the mouthpiece, then one or more second magnets, one or more second metal members, or a combination thereof are present on the first exterior surface of the resonance insert.

In one embodiment, the magnetic game caller is used to call waterfowl, upland game, small game, big game, or a combination thereof. In one embodiment, the magnetic game caller produces a game call in response to a passage of air into the mouthpiece and through the resonance insert that is generated by a user. In one embodiment, the mouthpiece includes one or more metals, one or more plastic, one or more woods, or a combination thereof. In one embodiment, the resonance insert includes one or more metals, one or more plastic, one or more woods, or a combination thereof. In one embodiment, the resonance insert further includes an insert body, a tone or sound board, a cork or wedge, and one or more reeds or one or more discs. In one embodiment, the first ring includes one or more first magnets. In one embodiment, the first ring includes one or more first metal members. In one embodiment, the first ring includes a combination of more first magnets and more first metals. In one embodiment, the second ring includes one or more second magnets. In one embodiment, the second ring includes one or more second metal members. In one embodiment, the second ring includes a combination of more second magnets and more second metals.

In one embodiment, the one or more exterior surfaces of the mouthpiece include one or more exterior projections at the distal end of the mouthpiece. In one embodiment, the one or more exterior projections are operatively connected to a lanyard.

The present invention provides a magnetic game caller. The magnetic game caller includes: a mouthpiece having a proximal end, a distal end, one or more exterior surfaces, a first interior surface, and a second interior surface, wherein the first interior surface of the mouthpiece is adjacent to the proximal end of the mouthpiece, wherein the second interior surface of the mouthpiece includes a first ring including one or more first magnets, a resonance insert having a proximal end, a distal end, a first exterior surface, a second exterior surface, and one or more interior surfaces, wherein the second exterior surface of the resonance insert has a diameter that is less than a diameter of the second interior surface of the mouthpiece, wherein the second exterior surface of the resonance insert includes a second ring including one or more second magnets, and wherein the resonance insert is coupled to and in fluid communication with the mouthpiece by a magnetic contact between the first ring and the second ring.

The present invention provides a magnetic game caller. The magnetic game caller includes: a mouthpiece having a proximal end, a distal end, one or more exterior surfaces, a first interior surface, and a second interior surface, wherein the first interior surface of the mouthpiece is adjacent to the proximal end of the mouthpiece, wherein the second interior surface of the mouthpiece includes a first ring including one or more first magnets, a resonance insert having a proximal end, a distal end, a first exterior surface, a second exterior surface, and one or more interior surfaces, wherein the second exterior surface of the resonance insert has a diameter that is less than a diameter of the second interior surface of the mouthpiece, wherein the second exterior surface of the resonance insert includes a second ring including one or more second magnets, wherein the resonance insert is coupled to and in fluid communication with the mouthpiece by a magnetic contact between the first ring and the second ring, and wherein the resonance insert includes an insert body, a tone or sound board, a cork or wedge, and one or more reeds or one or more discs.

The present invention provides a magnetic game caller. The magnetic game caller includes: a mouthpiece having a proximal end, a distal end, one or more exterior surfaces, a first interior surface, and a second interior surface, wherein the first interior surface of the mouthpiece is adjacent to the proximal end of the mouthpiece, wherein the second interior surface of the mouthpiece includes a first ring including one or more first magnet protrusions, one or more first metal member protrusions, or a combination thereof, a resonance insert having a proximal end, a distal end, a first exterior surface, a second exterior surface, and one or more interior surfaces, wherein the second exterior surface of the resonance insert has a diameter that is greater than a diameter of the second interior surface of the mouthpiece, wherein the second exterior surface of the resonance insert includes a second ring with one or more depressions configured to accept the one or more first magnet protrusions, the one or more first metal member protrusions, or the combination thereof, wherein the resonance insert is coupled to and in fluid communication with the mouthpiece by a magnetic contact between the first ring and the second ring, and provided that if the one or more first magnet protrusions are present on the first ring of the mouthpiece, then one or more depressions are present on the second ring of the resonance insert, or provided that if the one or more first metal member protrusions are present on the first ring of the mouthpiece, then one or more depressions are present on the second ring of the resonance insert, or provided that if a combination of one or more first magnet protrusions and one or more first metal member protrusions are present on the first ring of the mouthpiece, then one or more depressions are present on the first exterior surface of the resonance insert.

In one embodiment, the magnetic game caller is used to call waterfowl, upland game, small game, big game, or a combination thereof. In one embodiment, the magnetic game caller produces a game call in response to a passage of air into the mouthpiece and through the resonance insert that is generated by a user. In one embodiment, the mouthpiece includes one or more metals, one or more plastic, one or more woods, or a combination thereof. In one embodiment, the resonance insert includes one or more metals, one or more plastic, one or more woods, or a combination thereof. In one embodiment, the resonance insert further includes an insert body, a tone or sound board, a cork or wedge, and one or more reeds or one or more discs. In one embodiment, the first ring includes one or more first magnets. In one embodiment, the first ring includes one or more first metal members. In one embodiment, the first ring includes a combination of more first magnets and more first metals. In one embodiment, the second ring includes one or more second magnets. In one embodiment, the second ring includes one or more second metal members. In one embodiment, the second ring includes a combination of more second magnets and more second metals. In one embodiment, the one or more exterior surfaces of the mouthpiece include one or more exterior projections at the distal end of the mouthpiece. In one embodiment, the one or more exterior projections are operatively connected to a lanyard.

The present invention provides a magnetic game caller. The magnetic game caller includes: a mouthpiece having a proximal end, a distal end, one or more exterior surfaces, and one or more interior surfaces, wherein the one or more interior surfaces of the mouthpiece includes a first ring including one or more first magnets, one or more first metal members, or a combination thereof, a resonance insert having a proximal end, a distal end, one or more exterior surfaces, and one or more interior surfaces, wherein the one or more exterior surfaces of the resonance insert has a diameter that is less than a diameter of the one or more interior surfaces of the mouthpiece, wherein the one or more exterior surfaces of the resonance insert includes a second ring including one or more second magnets, one or more second metal members, or a combination thereof, wherein the resonance insert is coupled to and in fluid communication with the mouthpiece by a magnetic contact between the first ring and the second ring, and provided that if the one or more first magnets are present on the one or more interior surfaces of the mouthpiece, then one or more second magnets, one or more second metal members, or a combination thereof are present on the one or more exterior surfaces of the resonance insert, or provided that if the one or more first metal members are present on the one or more interior surfaces of the mouthpiece, then one or more second magnets are present on the one or more exterior surfaces of the resonance insert, or provided that if a combination of one or more first magnets and one or more first metal members are present on the one or more interior surfaces of the mouthpiece, then one or more second magnets, one or more second metal members, or a combination thereof are present on the one or more exterior surfaces of the resonance insert.

In one embodiment, the magnetic game caller is used to call waterfowl, upland game, small game, big game, or a combination thereof. In one embodiment, the magnetic game caller produces a game call in response to a passage of air into the mouthpiece and through the resonance insert that is generated by a user. In one embodiment, the mouthpiece includes one or more metals, one or more plastic, one or more woods, or a combination thereof. In one embodiment, the resonance insert includes one or more metals, one or more plastic, one or more woods, or a combination thereof. In one embodiment, the resonance insert further includes an insert body, a tone or sound board, a cork or wedge, and one or more reeds or one or more discs. In one embodiment, the first ring includes one or more first magnets. In one embodiment, the first ring includes one or more first metal members. In one embodiment, the first ring includes a combination of more first magnets and more first metals. In one embodiment, the second ring includes one or more second magnets. In one embodiment, the second ring includes one or more second metal members. In one embodiment, the second ring includes a combination of more second magnets and more second metals. In one embodiment, the one or more exterior surfaces of the mouthpiece include one or more exterior projections at the distal end of the mouthpiece. In one embodiment, the one or more exterior projections are operatively connected to a lanyard.

The present invention provides a magnetic game caller. The magnetic game caller includes: a mouthpiece having a proximal end, a distal end, one or more exterior surfaces, and one or more interior surfaces, wherein the one or more interior surfaces of the mouthpiece includes a first ring including one or more first magnets, one or more first metal members, or a combination thereof, a resonance insert having a proximal end, a distal end, one or more exterior surfaces, and one or more interior surfaces, wherein the one or more exterior surfaces of the resonance insert has a diameter that is less than a diameter of the one or more interior surfaces of the mouthpiece, wherein the one or more exterior surfaces of the resonance insert includes a second ring including one or more second magnets, one or more second metal members, or a combination thereof, wherein the resonance insert is coupled to and in fluid communication with the mouthpiece by a magnetic contact between the first ring and the second ring, and wherein the resonance insert includes an insert body, a tone or sound board, a cork or wedge, and one or more reeds or one or more discs.

The present invention provides a magnetic game caller modular system. The magnetic game caller modular system includes: a mouthpiece having a proximal end, a distal end, one or more exterior surfaces, a first interior surface, a second interior surface, and a third interior surface, wherein the first interior surface of the mouthpiece is adjacent to the proximal end of the mouthpiece, wherein the second interior surface of the mouthpiece is between the first interior surface of the mouthpiece and the third interior surface of the mouthpiece, wherein the second interior surface of the mouthpiece includes a first ring including one or more first magnets, one or more first metal members, or a combination thereof, wherein the third interior surface of the mouthpiece is adjacent to the distal end of the mouthpiece; two or more resonance inserts, wherein each of the two or more resonance inserts each independently has a proximal end, a distal end, a first exterior surface, a second exterior surface, and a third exterior surface, and one or more interior surfaces, wherein the first exterior surface of each of the two or more resonance inserts is adjacent to the proximal end of each of the two or more resonance inserts; wherein the second exterior surface of each of the two or more resonance inserts is between the first exterior surface of each of the two or more resonance inserts and the third interior surface of each of the two or more resonance inserts, wherein the second exterior surface of each of the two or more resonance inserts has a diameter that is greater than a diameter of the first interior surface of the mouthpiece, wherein the second exterior surface of each of the two or more resonance inserts includes a second ring including one or more second magnets, one or more second metal members, or a combination thereof, wherein the third exterior surface of each of the two or more resonance inserts has a diameter that is equal to or greater than the diameter of the one or more exterior surfaces of the mouthpiece, wherein each of the two or more resonance inserts is independently coupled to and in fluid communication with the mouthpiece by a magnetic contact between the first ring and the second ring, and provided that if the one or more first magnets are present on the third interior surface of the mouthpiece, then one or more second magnets, one or more second metal members, or a combination thereof are present on the second exterior surface of each of the two or more resonance inserts, or provided that if the one or more first metal members are present on the third interior surface of the mouthpiece, then one or more second magnets are present on the second exterior surface of the each of the two or more resonance inserts, or provided that if a combination of one or more first magnets and one or more first metal members are present on the third interior surface of the mouthpiece, then one or more second magnets, one or more second metal members, or a combination thereof are present on the second exterior surface of each of the two or more resonance inserts.

The present invention provides a magnetic game caller modular system. The magnetic game caller modular system includes: a mouthpiece having a proximal end, a distal end, one or more exterior surfaces, a first interior surface, a second interior surface, and a third interior surface, wherein the first interior surface of the mouthpiece is adjacent to the proximal end of the mouthpiece, wherein the second interior surface of the mouthpiece is between the first interior surface of the mouthpiece and the third interior surface of the mouthpiece, wherein the second interior surface of the mouthpiece includes a first ring including one or more first magnets and an O-ring between the first ring and the third interior surface, wherein the third interior surface of the mouthpiece is adjacent to the distal end of the mouthpiece; two or more resonance inserts, wherein each of the two or more resonance inserts each independently has a proximal end, a distal end, a first exterior surface, a second exterior surface, and a third exterior surface, and one or more interior surfaces, wherein the first exterior surface of each of the two or more resonance inserts is adjacent to the proximal end of each of the two or more resonance inserts; wherein the second exterior surface of each of the two or more resonance inserts is between the first exterior surface of each of the two or more resonance inserts and the third interior surface of each of the two or more resonance inserts, wherein the second exterior surface of each of the two or more resonance inserts has a diameter that is greater than a diameter of the first interior surface of the mouthpiece, wherein the second exterior surface of the resonance insert includes a second ring including one or more second magnets, wherein the third exterior surface of each of the two or more resonance inserts has a diameter that is equal to or greater than the diameter of the one or more exterior surfaces of the mouthpiece, and wherein each of the two or more resonance inserts is independently coupled to and in fluid communication with the mouthpiece by a magnetic contact between the first ring and the second ring.

The present invention provides a magnetic game caller modular system. The magnetic game caller modular system includes: a mouthpiece having a proximal end, a distal end, one or more exterior surfaces, a first interior surface, a second interior surface, and a third interior surface, wherein the first interior surface of the mouthpiece is adjacent to the proximal end of the mouthpiece, wherein the second interior surface of the mouthpiece is between the first interior surface of the mouthpiece and the third interior surface of the mouthpiece, wherein the second interior surface of the mouthpiece includes a first ring including one or more first magnets and an O-ring between the first ring and the third interior surface, wherein the third interior surface of the mouthpiece is adjacent to the distal end of the mouthpiece, wherein the one or more exterior surfaces of the mouthpiece comprise one or more exterior projections at the distal end of the mouthpiece, wherein the one or more exterior projections are operatively connected to a lanyard; two or more resonance inserts, wherein each of the two or more resonance inserts each independently has a proximal end, a distal end, a first exterior surface, a second exterior surface, and a third exterior surface, and one or more interior surfaces, wherein the first exterior surface of each of the two or more resonance inserts is adjacent to the proximal end of each of the two or more resonance inserts; wherein the second exterior surface of each of the two or more resonance inserts is between the first exterior surface of each of the two or more resonance inserts and the third interior surface of each of the two or more resonance inserts, wherein the second exterior surface of each of the two or more resonance inserts has a diameter that is greater than a diameter of the first interior surface of the mouthpiece, wherein the second exterior surface of the resonance insert includes a second ring including one or more second magnets, wherein the third exterior surface of each of the two or more resonance inserts has a diameter that is equal to or greater than the diameter of the one or more exterior surfaces of the mouthpiece, and wherein each of the two or more resonance inserts is independently coupled to and in fluid communication with the mouthpiece by a magnetic contact between the first ring and the second ring.

BRIEF DESCRIPTION OF THE DRAWINGS

Embodiments of the invention may be best understood by referring to the following description and accompanying drawings, which illustrate such embodiments.
In the drawings.

Figure 1:
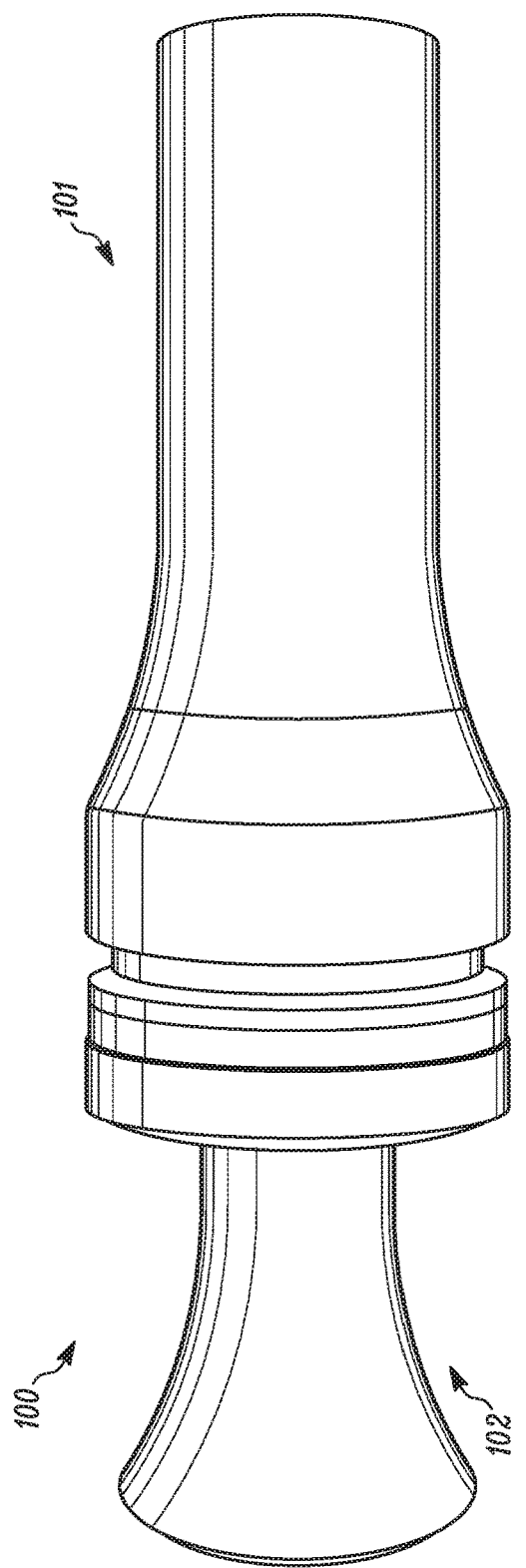
FIG. 1 is a side view drawing illustrating an exemplary magnetic game caller.

The drawings are not necessarily to scale. Like numbers used in the figures refer to like components, steps, and the like. However, it will be understood that the use of a number to refer to a component in a given figure is not intended to limit the component in another figure labeled with the same number.

DETAILED DESCRIPTION OF THE INVENTION

The present invention provides a magnetic game caller. The magnetic game caller includes a mouthpiece and a resonance insert. The resonance insert is coupled the mouthpiece by a magnetic contact between a ring in the magnetic ring in the mouthpiece and a magnetic ring in the resonance insert. This magnetic connection avoids the problems of friction fitted game callers described above.

The present invention also provides a magnetic game caller modular system. The magnetic game caller modular system includes: a mouthpiece and two or more resonance inserts. The magnetic game caller modular system simplifies the user experience and results in lower manufacturing costs by creating a flexible universal magnetic connection for mouthpieces and resonance inserts. Thus, one mouthpiece can host a number of different types of resonance inserts. This rids the user of having to purchase multiple game callers.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

The referenced items are provided solely for their disclosure prior to the filing date of the present application. Nothing herein is to be construed as an admission that the present invention is not entitled to antedate such material by virtue of prior invention.

Unless otherwise indicated, the words and phrases presented in this document have their ordinary meanings to one of skill in the art. Such ordinary meanings can be obtained by reference to their use in the art and by reference to general and scientific dictionaries, for example, *Webster's Third New International Dictionary*, Merriam-Webster Inc., Springfield, Mass., 1993 and *The American Heritage Dictionary of the English Language*, Houghton Mifflin, Boston Mass., 1981.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements or use of a "negative" limitation.

As used herein, the term "comprising" or "comprises" is intended to mean that the compositions and methods include the recited elements, but not excluding others.

As used herein, the term "call" refers to any sound that attracts a particular game animal. These calls can include, for example, a duck call, a goose call, a turkey call, and the like. That mimic the various sounds that a game animal may make such as a feeding call, a greeting call, a warning call, a come-back call, and the like. Each type of wild game will have its own specific sounds. As a result, hunters have created various types of "calls" to replicate these sounds. Many calls use some kind of explosion or burst of air to create the sound. Other calls use friction or scraping sounds to create the sounds. Typically, each type of call has different parts. For example, most duck and goose calls have five basic parts including: a barrel, an insert, a tone board or sound board, a cork or wedge, and reeds or discs. Game animals typically make various noises including clicks, clucks, quacks, grunts, grumbles, gobbles, squeals, whistles, yelps, or combinations thereof.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

As used herein, the phrase "game caller" refers to a device that is used to attract game to the user. There are several general categories of game call including, for example, (1) waterfowl (e.g., birds that migrate) including, for example, ducks with more than 40 species each having its own call, geese, cranes, swans, snipe, coots, mud hens, and the like), (2) upland game (e.g., birds and other animals that do not migrate) including, for example, turkey, pheasant, grouse, squirrel, and the like, (3) big game including, for example, deer, elk, caribou, moose, bear, and large cats such as mountain lions, cougars, lynx, and the like.

As used herein, the terms "include," "for example," "such as," and the like are used illustratively and are not intended to limit the present invention.

As used herein, the terms "invention," "the invention," "this invention," "the present invention" and "disclosure" are intended to refer broadly to all of the subject matter of this patent and the patent claims below. Statements containing these terms should be understood not to limit the subject matter described herein or to limit the meaning or scope of the patent claims below. The subject matter should be understood by reference to appropriate portions of the entire specification of this patent, any or all drawings and each claim.

As used herein, the phrase "operatively coupled" refers to bringing two or more items together or into relationship with each other such that the) may operate together or allow transfer of information between the two or more items.

As used herein, the terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

As used herein, the term "proximal" refers to the closest end of an object. In contrast, the term "distal" refers to the farthest end of an object.

As used herein, the terms "front," "back," "rear," "upper," "lower," "right," and "left" in this description are merely used to identify the various elements as they are oriented in the FIGS, with "front," "back," and "rear" being relative apparatus. These terms are not meant to limit the element which they describe, as the various elements may be oriented differently in various applications.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The invention illustratively disclosed herein suitably may be practiced in the absence of any element which is not specifically disclosed herein.

FIG. 1 is a side view drawing illustrating an exemplary magnetic game caller 100. The magnetic game caller 100 includes a mouthpiece 101 and a resonance insert 102. The mouthpiece 101 is coupled to and in fluid communication with the resonance insert 102 by two magnetic rings (not shown). In one embodiment, the game caller 100 is used to call waterfowl, upland game, small game, big game, or a combination thereof. In one embodiment, the game caller 100 produces a game call in response to a passage of air into the mouthpiece 101 and through the resonance insert 102 that is generated by a user. In one embodiment, the mouthpiece 101 includes one or more metals, one or more plastic, one or more woods, or a combination thereof. In one embodiment, the resonance insert 102 includes one or more metals, one or more plastic, one or more woods, or a combination thereof.

Figure 2:
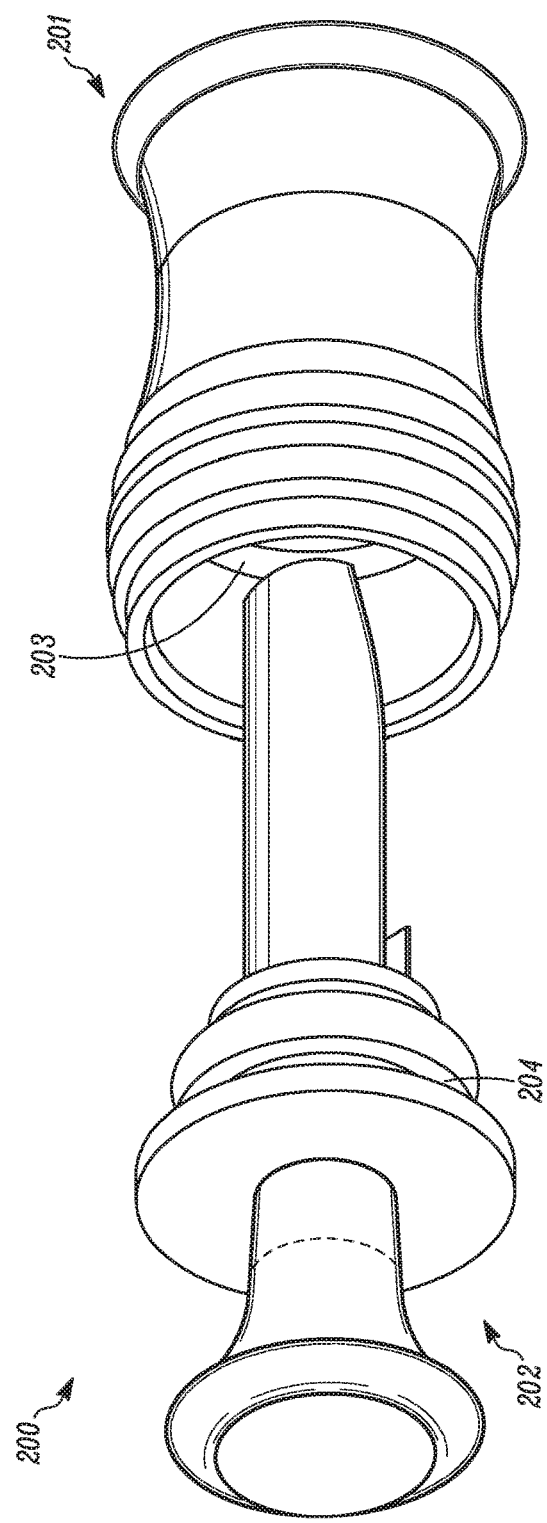
FIG. 2 is an exploded perspective view drawing illustrating an exemplary magnetic game caller.

FIG. 2 is an exploded perspective view drawing illustrating an exemplary magnetic game caller 200. The magnetic game caller 200 includes a mouthpiece 201 and a resonance insert 202. The mouthpiece 201 is coupled to and in fluid communication with the resonance insert 202 by two magnetic rings 203 and 204.

Figure 3:
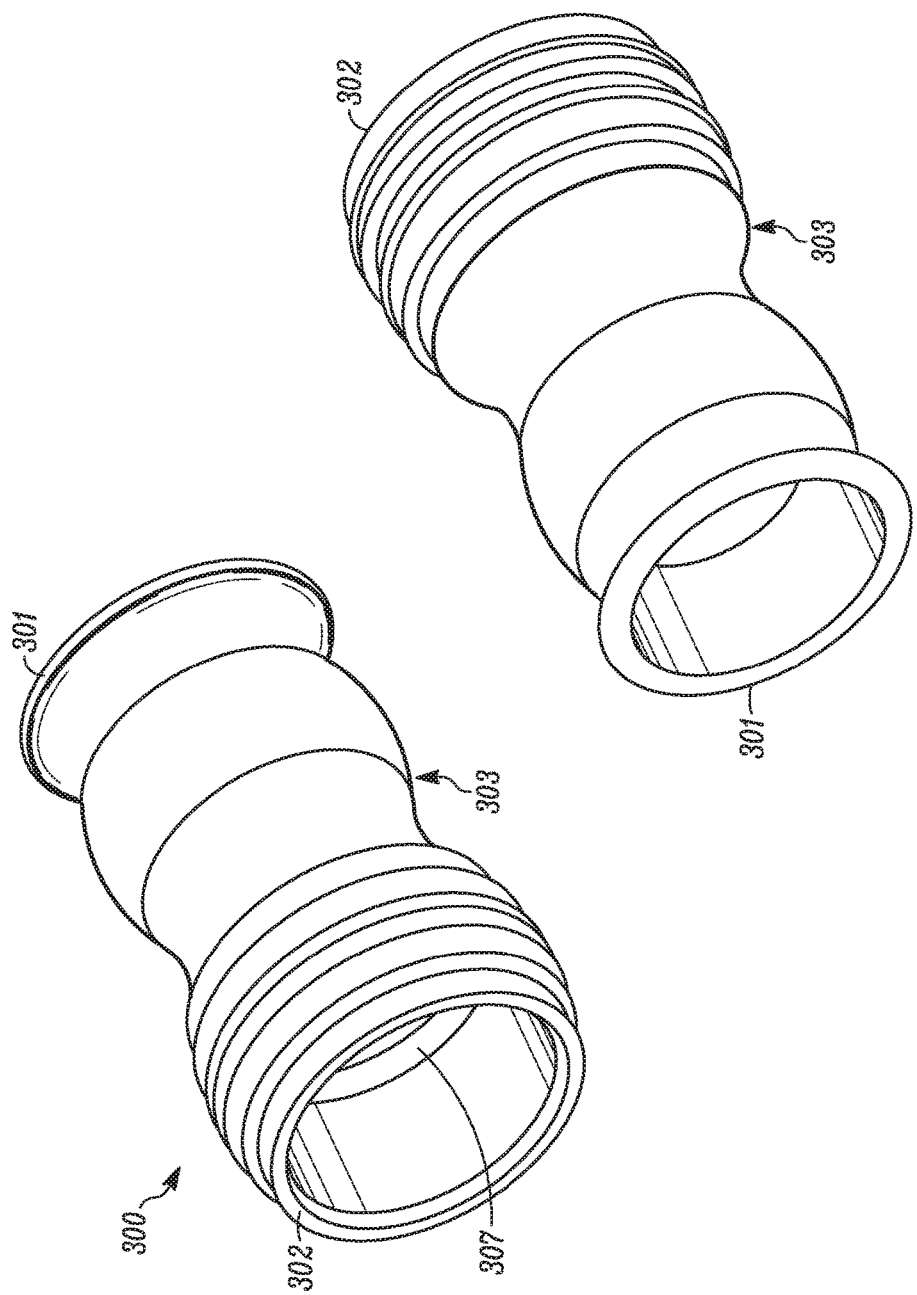
FIG. 3 includes two perspective view drawings illustrating an exemplary mouthpiece of an exemplary magnetic game caller.
Figure 4:
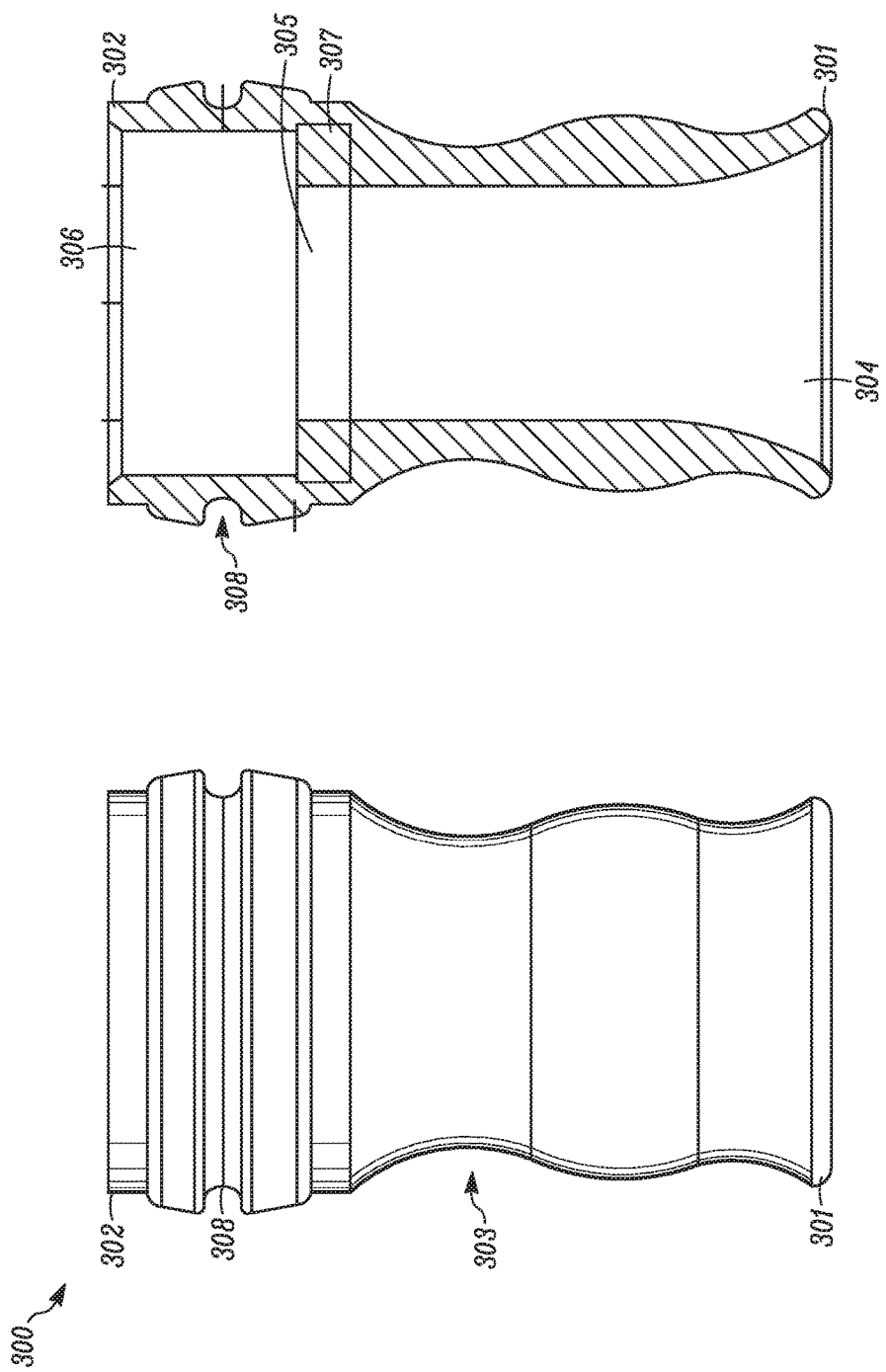
FIG. 4 includes a side view and a cut-away side view drawing illustrating an exemplary mouthpiece of an exemplary magnetic game caller.
Figure 5:
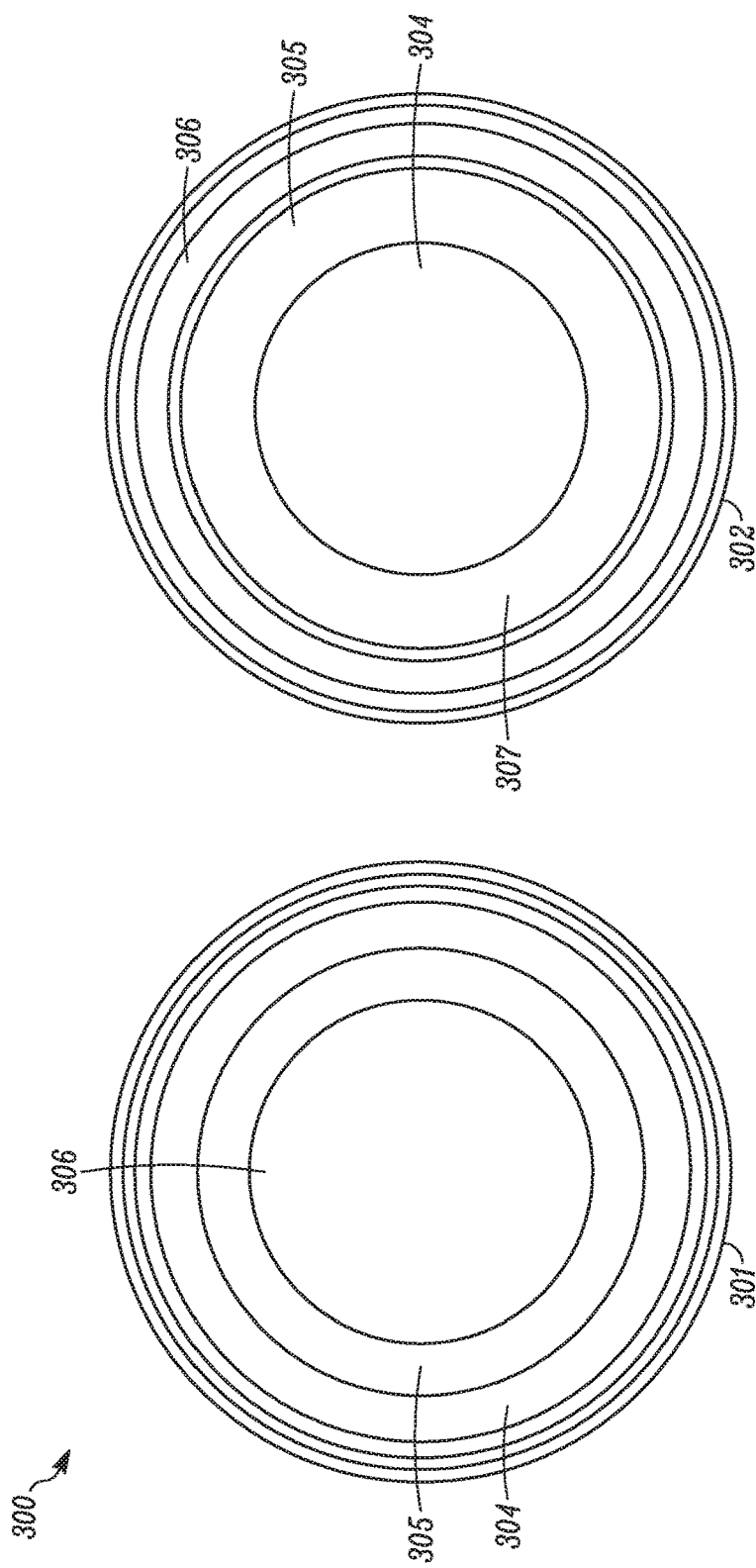
FIG. 5 includes a top view and a bottom view drawing illustrating an exemplary mouthpiece of an exemplary magnetic game caller.

FIGS. 3-5 are various perspective view, side view, top view, and bottom view drawings illustrating an exemplary mouthpiece 300 of an exemplary magnetic game caller. The mouthpiece 300 has a proximal end 301, a distal end 302, one or more exterior surfaces 303, a first interior surface 304, a second interior surface 305, and a third interior surface 306. The first interior surface 304 of the mouthpiece 300 is adjacent to the proximal end 301 of the mouthpiece. The second interior surface 305 of the mouthpiece 300 is between the first interior surface 304 of the mouthpiece 300 and the third interior surface 306 of the mouthpiece 300. The second interior surface 305 of the mouthpiece 300 includes a first ring 307 including one or more first magnets, one or more first metal members, or a combination thereof. The third interior surface 306 of the mouthpiece 300 is adjacent to the distal end 302 of the mouthpiece 300.

In one embodiment, the first ring 307 includes one or more first magnets. In one embodiment, the first ring 307 includes one or more first metal members. In one embodiment, the first ring 307 includes a combination of more first magnets and more first metals.

Figure 6:
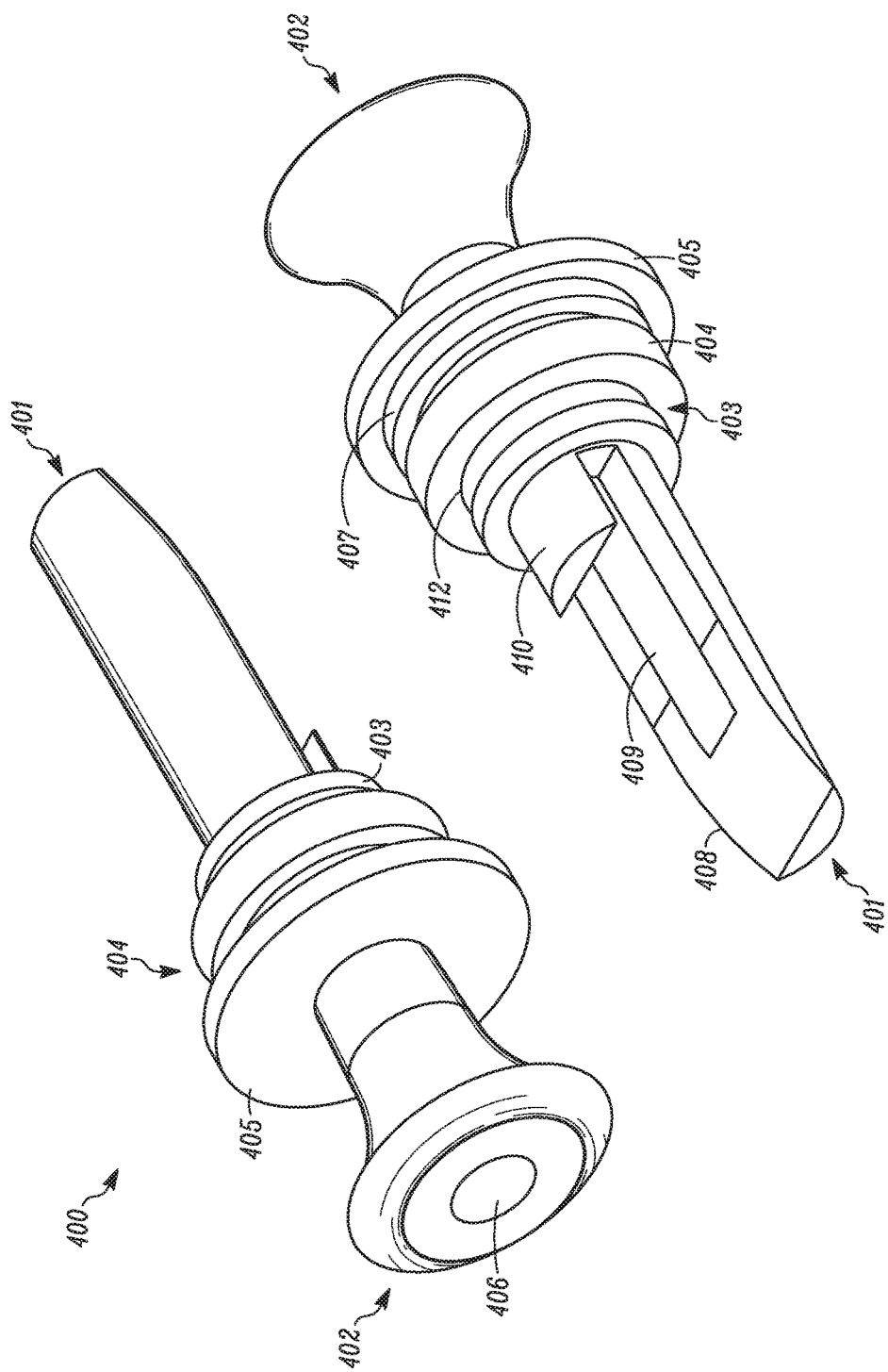
FIG. 6 includes two perspective view drawings illustrating an exemplary resonance insert of an exemplary magnetic game caller.
Figure 7:
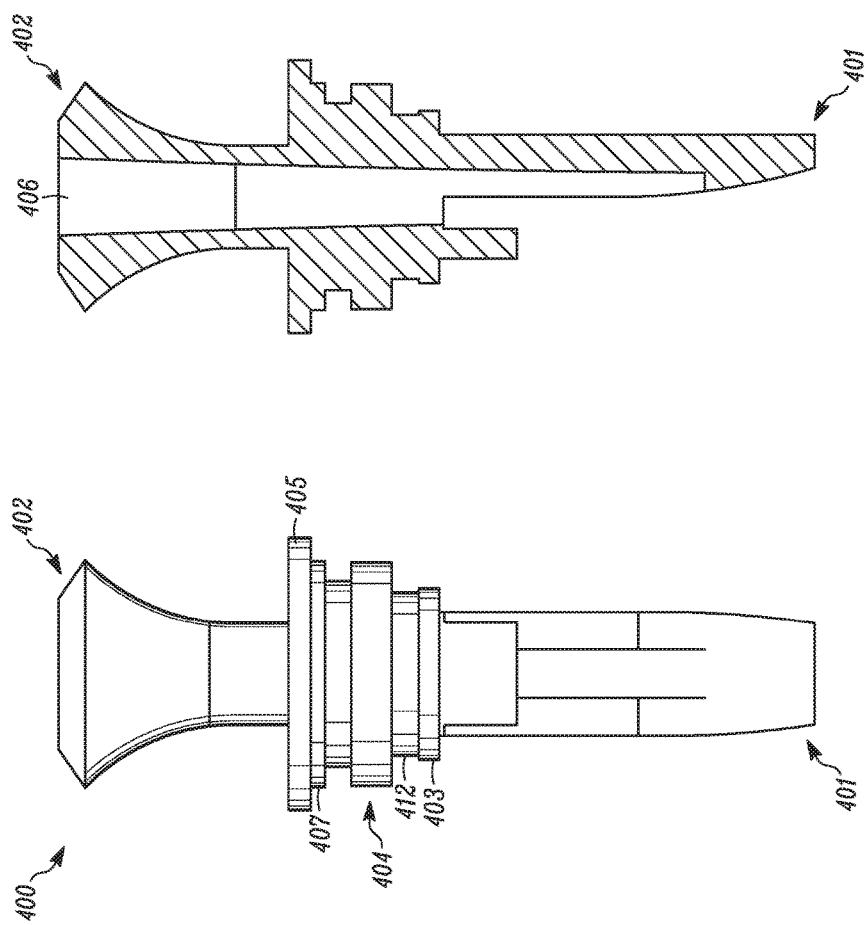
FIG. 7 includes a side view and a cut-away side view drawing illustrating an exemplary resonance insert of an exemplary magnetic game caller.
Figure 8:
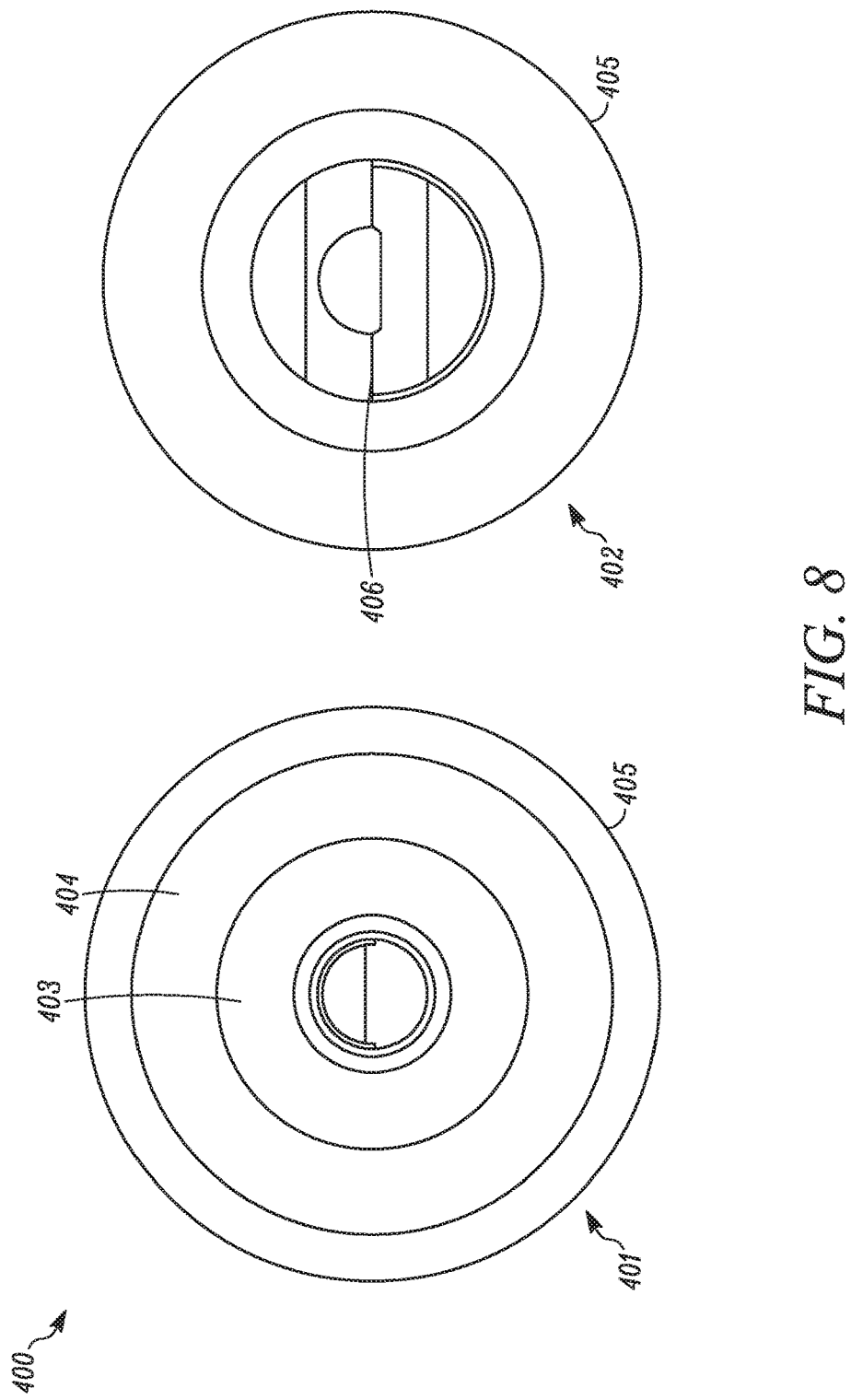
FIG. 8 includes a top view and a bottom view drawing illustrating an exemplary resonance insert of an exemplary magnetic game caller.

FIGS. 6-8 are various perspective view, side view, top view, and bottom view drawings illustrating an exemplary resonance insert 400 of an exemplary magnetic game caller. The resonance insert 400 has a proximal end 401, a distal end 402, a first exterior surface 403, a second exterior surface 404, and a third exterior surface 405, and one or more interior surfaces 406. The first exterior surface 403 of the resonance insert 400 is adjacent to the proximal end 401 of the resonance insert 400. The second exterior surface 404 of the resonance insert 400 has a diameter that is greater than a diameter of the first interior surface of the mouthpiece (not shown). The second exterior surface of the resonance insert 400 is between the first exterior surface of the resonance insert 400 and the third interior surface of the resonance insert 400. The second exterior surface 404 of the resonance insert 400 includes a second ring 407 including one or more second magnets. The third exterior surface 405 of the resonance insert 400 has a diameter that is equal to or greater than the diameter of the one or more exterior surfaces of the mouthpiece (not shown). The resonance insert 400 includes an insert body 408, a tone or sound board 409, a cork or wedge 410, and one or more reeds (not shown) or one or more discs (not shown) on the one or more interior surfaces 406 of the resonance insert 400.

Figure 9:
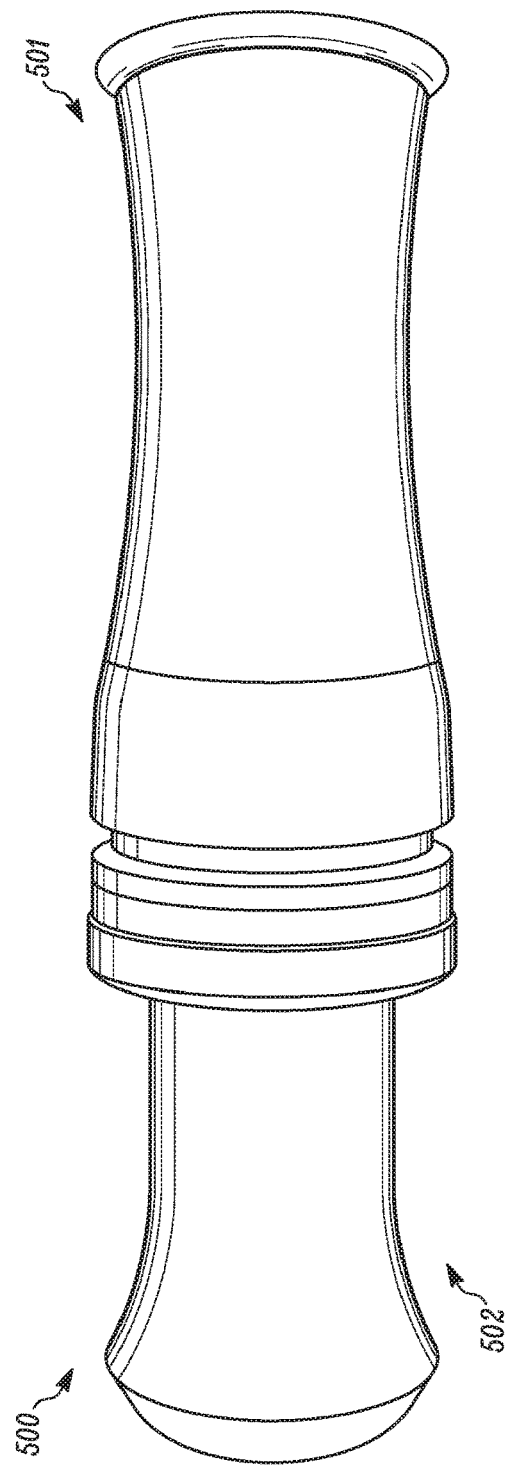
FIG. 9 is a side view drawing illustrating an exemplary magnetic game caller.

FIG. 9 is a side view drawing illustrating an exemplary magnetic game caller 500. The magnetic game caller 500 includes a mouthpiece 501 and a resonance insert 502. The mouthpiece 501 is coupled to and in fluid communication with the resonance insert 502 by two magnetic rings (not shown).

Figure 10:
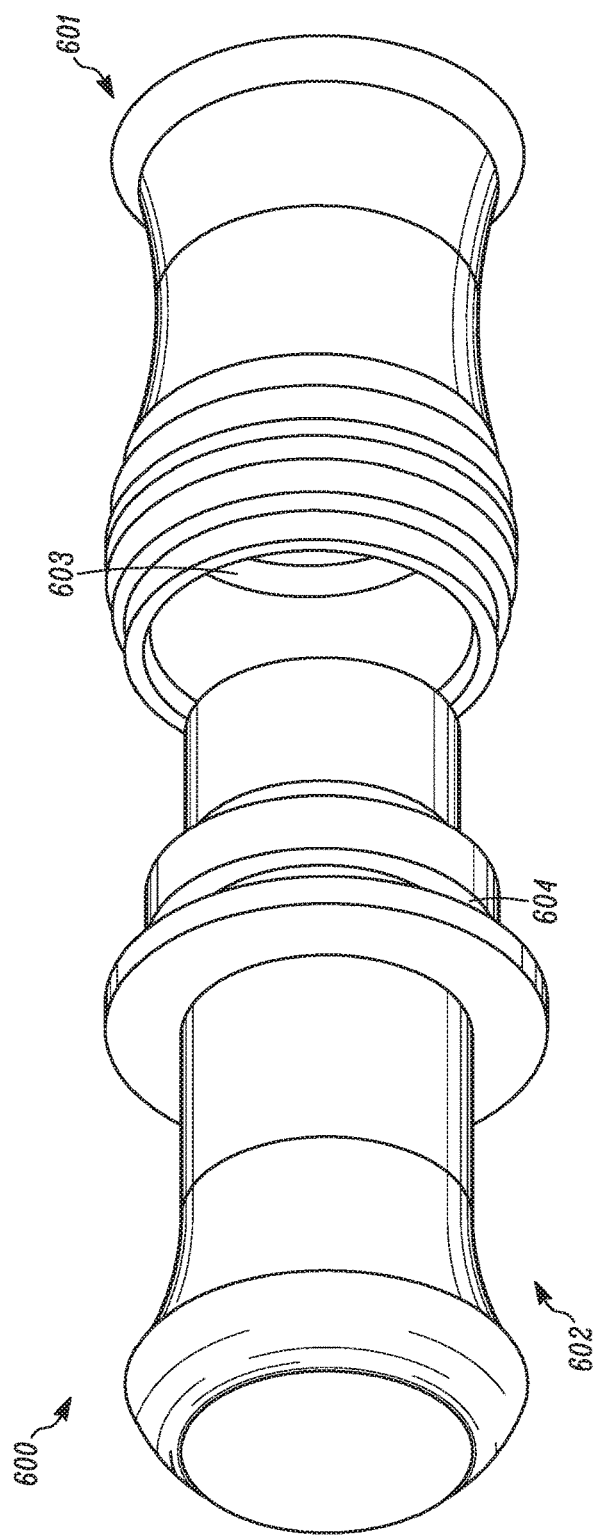
FIG. 10 is an exploded perspective view drawing illustrating an exemplary magnetic game caller.

FIG. 10 is an exploded perspective view drawing illustrating an exemplary magnetic game caller 600. The magnetic game caller 600 includes a mouthpiece 601 and a resonance insert 602. The mouthpiece 601 is coupled to and in fluid communication with the resonance insert 602 by two magnetic rings 603 and 604.

In one embodiment, the game caller 600 produces a game call in response to a passage of air into the mouthpiece 601 and through the resonance insert 602 that is generated by a user. In one embodiment, the mouthpiece 601 includes one or more metals, one or more plastic, one or more woods, or a combination thereof. In one embodiment, the resonance insert 602 includes one or more metals, one or more plastic, one or more woods, or a combination thereof.

Figure 11:
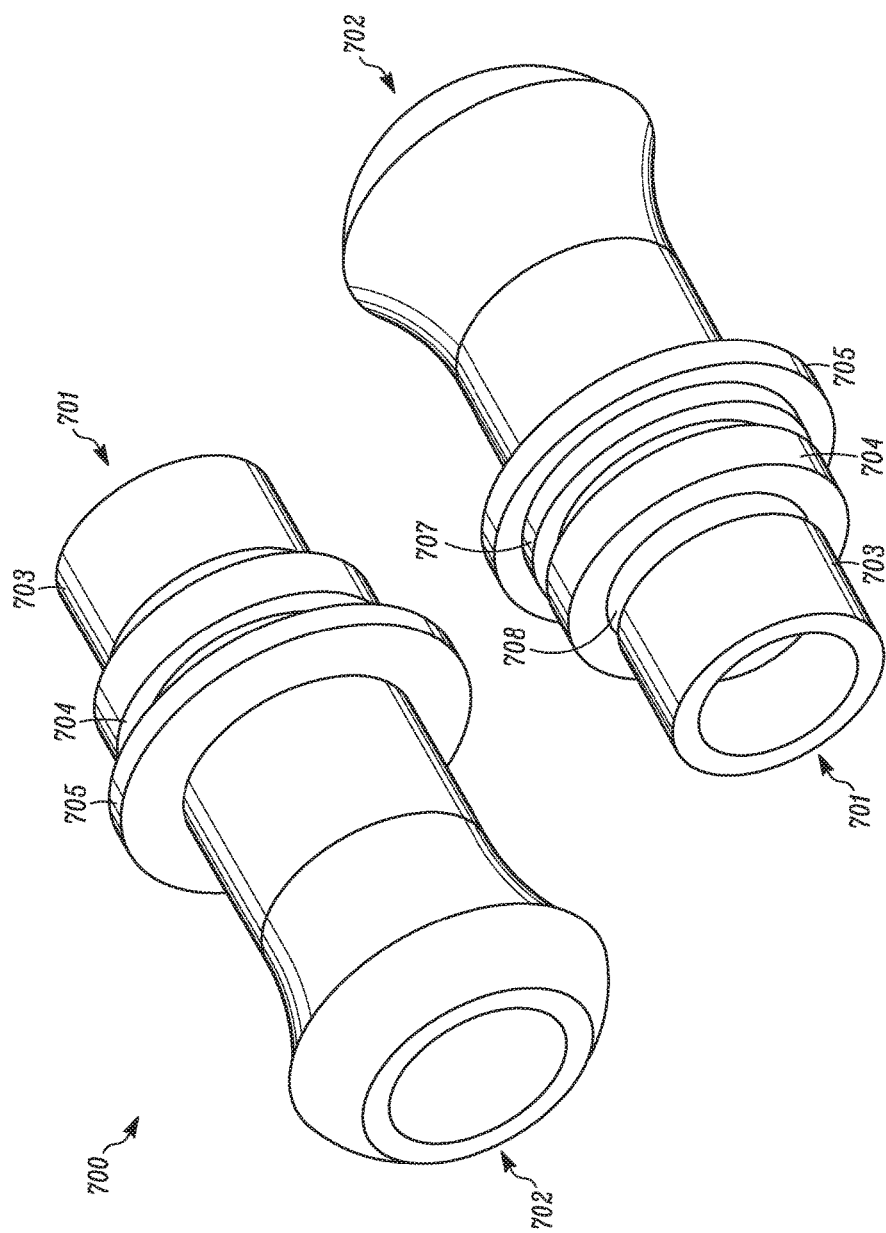
FIG. 11 includes two perspective view drawings illustrating an exemplary resonance insert of an exemplary magnetic game caller.
Figure 12:
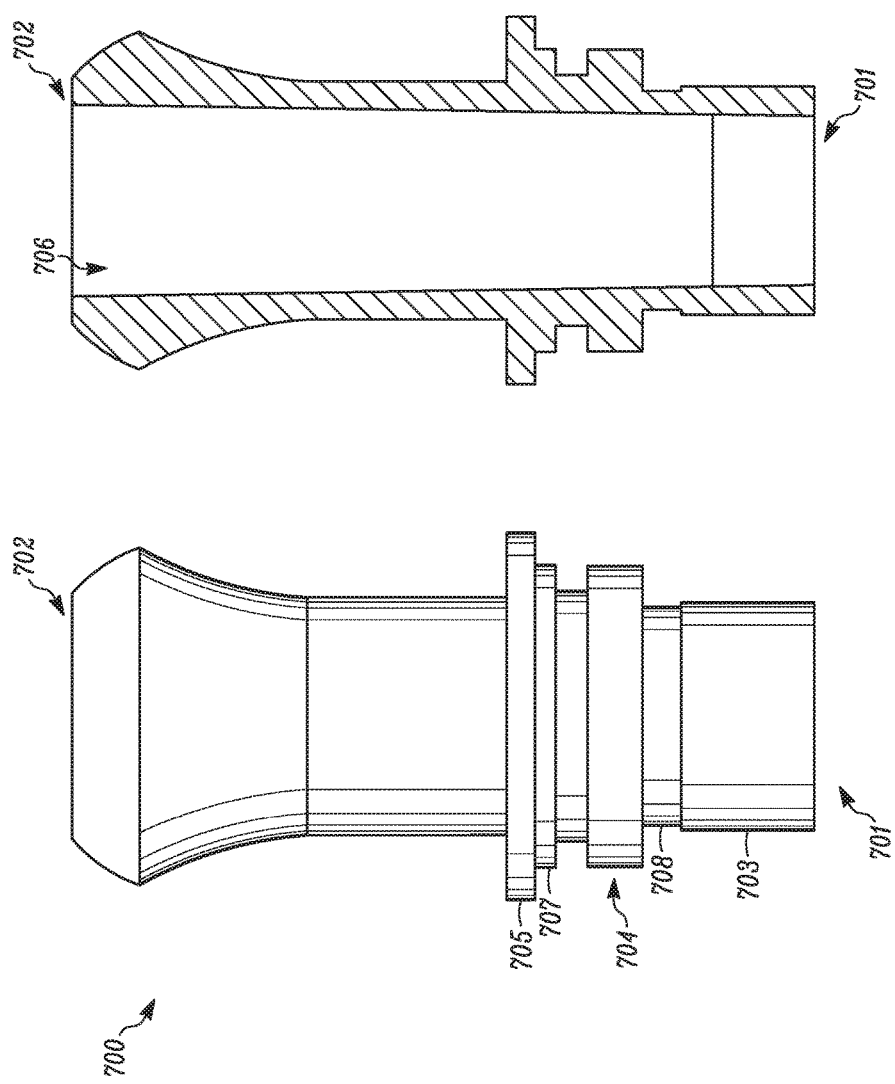
FIG. 12 includes a side view and a cut-away side view drawing illustrating an exemplary resonance insert of an exemplary magnetic game caller.
Figure 13:
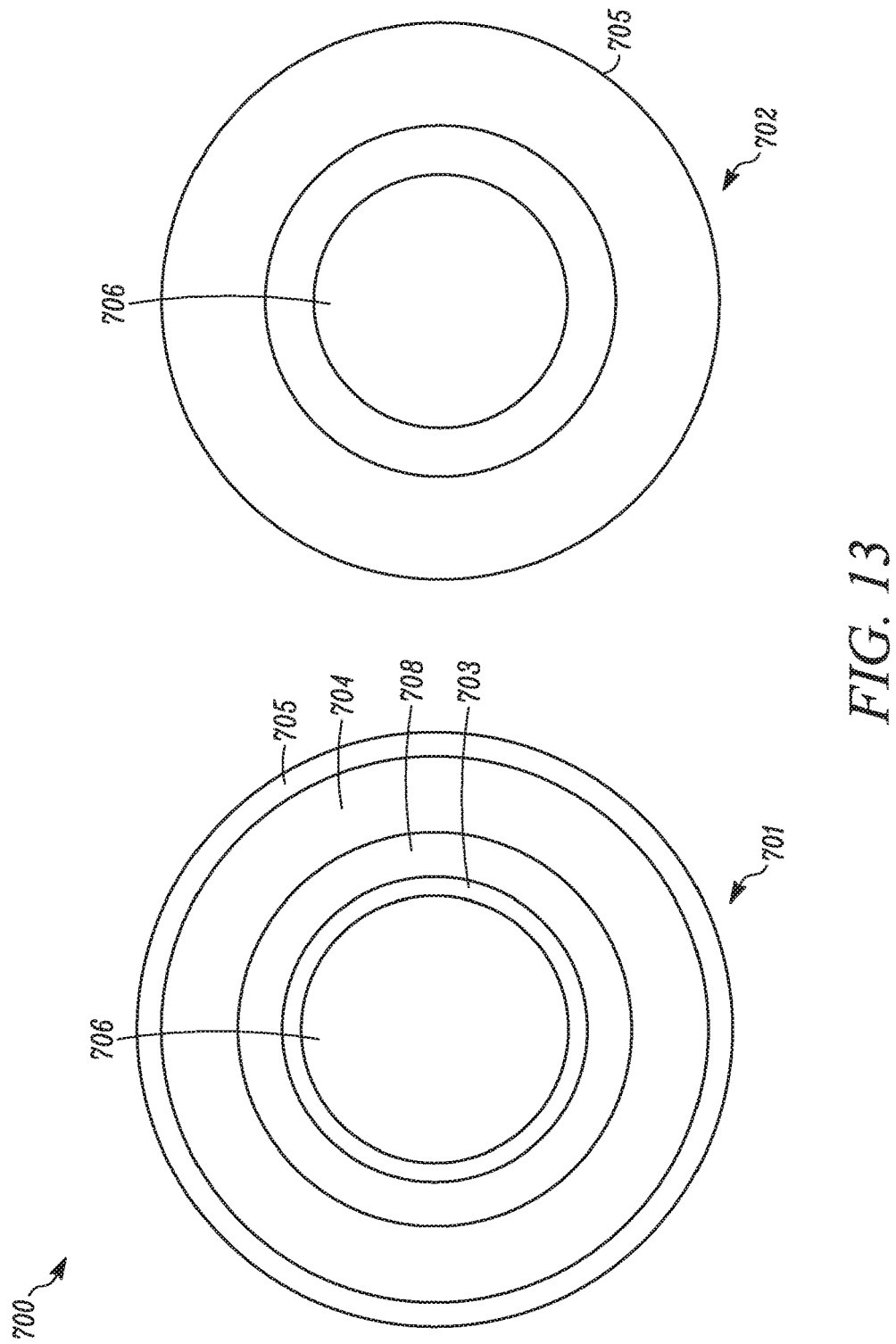
FIG. 13 includes a top view and a bottom view drawing illustrating an exemplary resonance insert of an exemplary magnetic game caller.

FIGS. 11-13 are various perspective view, side view, top view, and bottom view drawings illustrating an exemplary resonance insert 700 of an exemplary magnetic game caller. The resonance insert 700 has a proximal end 701, a distal end 702, a first exterior surface 703, a second exterior surface 704, and a third exterior surface 705, and one or more interior surfaces 706. The first exterior surface 703 of the resonance insert 700 is adjacent to the proximal end 701 of the resonance insert 700. The second exterior surface of the resonance insert 700 is between the first exterior surface of the resonance insert 700 and the third interior surface of the resonance insert 700. The second exterior surface 704 of the resonance insert 700 has a diameter that is greater than a diameter of the first interior surface of the mouthpiece (not shown). The second exterior surface 704 of the resonance insert 700 includes a second ring 707 including one or more second magnets. The third exterior surface 705 of the resonance insert 700 has a diameter that is equal to or greater than the diameter of the one or more exterior surfaces of the mouthpiece (not shown). The resonance insert 700 is coupled to and in fluid communication with the mouthpiece by a magnetic contact between the first ring and the second ring 707.

In the claims provided herein, the steps specified to be taken in a claimed method or process may be carried out in any order without departing from the principles of the invention, except when a temporal or operational sequence is explicitly defined by claim language. Recitation in a claim to the effect that first a step is performed then several other steps are performed shall be taken to mean that the first step is performed before any of the other steps, but the other steps may be performed in any sequence unless a sequence is further specified within the other steps. For example, claim elements that recite "first A, then B, C, and D, and lastly E" shall be construed to mean step A must be first, step E must be last, but steps B. C, and D may be carried out in any sequence between steps A and E and the process of that sequence will still fall within the four corners of the claim.

Furthermore, in the claims provided herein, specified steps may be carried out concurrently unless explicit claim language requires that they be carried out separately or as parts of different processing operations. For example, a claimed step of doing X and a claimed step of doing Y may be conducted simultaneously within a single operation, and the resulting process will be covered by the claim. Thus, a step of doing X, a step of doing Y, and a step of doing Z may be conducted simultaneously within a single process step, or in two separate process steps, or in three separate process steps, and that process will still fall within the four corners of a claim that recites those three steps.

Similarly, except as explicitly required by claim language, a single substance or component may meet more than a single functional requirement, provided that the single substance or component fulfills the more than one functional requirement as specified by claim language.

All patents, patent applications, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Additionally, all claims in this application, and all priority applications, including but not limited to original claims, are hereby incorporated in their entirety into, and form a part of, the written description of the invention.

Applicant reserves the right to physically incorporate into this specification any and all materials and information from any such patents, applications, publications, scientific articles, web sites, electronically available information, and other referenced materials or documents. Applicant reserves the right to physically incorporate into any part of this document, including any part of the written description, the claims referred to above including but not limited to any original claims.

What is claimed is:

1. A magnetic game caller comprising:
   a mouthpiece having a proximal end, a distal end, one or more exterior surfaces, a first interior surface, a second interior surface, and a third interior surface,
      wherein the first interior surface of the mouthpiece is adjacent to the proximal end of the mouthpiece,
      wherein the second interior surface of the mouthpiece is between the first interior surface of the mouthpiece and the third interior surface of the mouthpiece,
      wherein the second interior surface of the mouthpiece comprises a first ring comprising one or more first magnets, one or more first metal members, or a combination thereof,
      wherein the third interior surface of the mouthpiece is adjacent to the distal end of the mouthpiece;
   a resonance insert having a proximal end, a distal end, a first exterior surface, a second exterior surface, and a third exterior surface, and one or more interior surfaces,
      wherein the first exterior surface of the resonance insert is adjacent to the proximal end of the resonance insert;
      wherein the second exterior surface of the resonance insert is between the first exterior surface of the resonance insert and the third interior surface of the resonance insert,
      wherein the second exterior surface of the resonance insert has a diameter that is greater than a diameter of the first interior surface of the mouthpiece,
      wherein the second exterior surface of the resonance insert comprises a second ring comprising one or more second magnets, one or more second metal members, or a combination thereof,
      wherein the third exterior surface of the resonance insert has a diameter that is equal to or greater than the diameter of the one or more exterior surfaces of the mouthpiece,
      wherein the resonance insert is coupled to and in fluid communication with the mouthpiece by a magnetic contact between the first ring and the second ring, and
      provided that if the one or more first magnets are present on the third interior surface of the mouthpiece, then one or more second magnets, one or more second metal members, or a combination thereof are present on the second exterior surface of the resonance insert, or
      provided that if the one or more first metal members are present on the third interior surface of the mouthpiece, then one or more second magnets are present on the second exterior surface of the resonance insert, or
      provided that if a combination of one or more first magnets and one or more first metal members are present on the third interior surface of the mouthpiece, then one or more second magnets, one or more second metal members, or a combination thereof are present on the second exterior surface of the resonance insert.

2. The magnetic game caller of claim 1, wherein the magnetic game caller produces a game call in response to a passage of air into the mouthpiece and through the resonance insert that is generated by a user.

3. The magnetic game caller of claim 1, wherein the resonance insert further comprises an insert body, a tone or sound board, a cork or wedge, and one or more reeds or one or more discs in the one or more interior surfaces of the resonance insert.

4. The magnetic game caller of claim 1, wherein the first ring comprises one or more first magnets.

5. The magnetic game caller of claim 1, wherein the second ring comprises one or more second magnets.

6. The magnetic game caller of claim 1, wherein the first exterior surface of the resonance insert has a diameter that is equal to or less than a diameter of the third interior surface of the mouthpiece.

7. The magnetic game caller of claim 1, wherein the second interior surface of the mouthpiece comprises a seal ring between the first ring and the third interior surface.

8. The magnetic game caller of claim 7, wherein the seal ring is an O-ring.

9. A magnetic game caller comprising:
   a mouthpiece having a proximal end, a distal end, one or more exterior surfaces, a first interior surface, a second interior surface, and a third interior surface,
      wherein the first interior surface of the mouthpiece is adjacent to the proximal end of the mouthpiece,
      wherein the second interior surface of the mouthpiece is between the first interior surface of the mouthpiece and the third interior surface of the mouthpiece,
      wherein the second interior surface of the mouthpiece comprises a first ring comprising one or more first magnets and an O-ring between the first ring and the third interior surface,
      wherein the third interior surface of the mouthpiece is adjacent to the distal end of the mouthpiece:
   a resonance insert having a proximal end, a distal end, a first exterior surface, a second exterior surface, and a third exterior surface, and one or more interior surfaces,
      wherein the first exterior surface of the resonance insert is adjacent to the proximal end of the resonance insert;

wherein the second exterior surface of the resonance insert is between the first exterior surface of the resonance insert and the third interior surface of the resonance insert,
wherein the second exterior surface of the resonance insert has a diameter that is greater than a diameter of the first interior surface of the mouthpiece,
wherein the second exterior surface of the resonance insert comprises a second ring comprising one or more second magnets,
wherein the third exterior surface of the resonance insert has a diameter that is equal to or greater than the diameter of the one or more exterior surfaces of the mouthpiece, and
wherein the resonance insert is coupled to and in fluid communication with the mouthpiece by a magnetic contact between the first ring and the second ring.

10. The magnetic game caller of claim 9, wherein the magnetic game caller produces a game call in response to a passage of air into the mouthpiece and through the resonance insert that is generated by a user.

11. The magnetic game caller of claim 9, wherein the resonance insert further comprises an insert body, a tone or sound board, a cork or wedge, and one or more reeds or one or more discs.

12. The magnetic game caller of claim 9, wherein the one or more exterior surfaces of the mouthpiece comprise one or more exterior projections at the distal end of the mouthpiece.

13. A magnetic game caller modular system comprising:
a mouthpiece having a proximal end, a distal end, one or more exterior surfaces, a first interior surface, a second interior surface, and a third interior surface,
wherein the first interior surface of the mouthpiece is adjacent to the proximal end of the mouthpiece,
wherein the second interior surface of the mouthpiece is between the first interior surface of the mouthpiece and the third interior surface of the mouthpiece,
wherein the second interior surface of the mouthpiece comprises a first ring comprising one or more first magnets, one or more first metal members, or a combination thereof,
wherein the third interior surface of the mouthpiece is adjacent to the distal end of the mouthpiece;
two or more resonance inserts,
wherein each of the two or more resonance inserts each independently has a proximal end, a distal end, a first exterior surface, a second exterior surface, and a third exterior surface, and one or more interior surfaces,
wherein the first exterior surface of each of the two or more resonance inserts is adjacent to the proximal end of each of the two or more resonance inserts;
wherein the second exterior surface of each of the two or more resonance inserts is between the first exterior surface of each of the two or more resonance inserts and the third interior surface of each of the two or more resonance inserts,
wherein the second exterior surface of each of the two or more resonance inserts has a diameter that is greater than a diameter of the first interior surface of the mouthpiece,
wherein the second exterior surface of each of the two or more resonance inserts comprises a second ring comprising one or more second magnets, one or more second metal members, or a combination thereof,
wherein the third exterior surface of each of the two or more resonance inserts has a diameter that is equal to or greater than the diameter of the one or more exterior surfaces of the mouthpiece,
wherein each of the two or more resonance inserts is independently coupled to and in fluid communication with the mouthpiece by a magnetic contact between the first ring and the second ring, and
provided that if the one or more first magnets are present on the third interior surface of the mouthpiece, then one or more second magnets, one or more second metal members, or a combination thereof are present on the second exterior surface of each of the two or more resonance inserts, or
provided that if the one or more first metal members are present on the third interior surface of the mouthpiece, then one or more second magnets are present on the second exterior surface of the each of the two or more resonance inserts, or
provided that if a combination of one or more first magnets and one or more first metal members are present on the third interior surface of the mouthpiece, then one or more second magnets, one or more second metal members, or a combination thereof are present on the second exterior surface of each of the two or more resonance inserts.

14. The magnetic game caller modular system of claim 13, wherein the magnetic game caller modular system produces a game call in response to a passage of air into the mouthpiece and through each of the two or more resonance inserts that is generated by a user.

* * * * *